United States Patent
Fejer et al.

(10) Patent No.: US 6,555,293 B1
(45) Date of Patent: Apr. 29, 2003

(54) METHOD FOR FABRICATING EFFICIENT SOURCES OF ELECTROMAGNETIC RADIATION

(75) Inventors: Martin M. Fejer, Menlo Park; Gregory D. Miller, Foster City; Robert G. Batchko; Robert L. Byer, both of Stanford, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/464,464

(22) Filed: Dec. 14, 1999

Related U.S. Application Data

(60) Provisional application No. 60/112,385, filed on Dec. 14, 1998.

(51) Int. Cl.⁷ .......................... G03C 5/00; G01B 15/00; H05B 6/00; G02F 1/35; H01L 31/0232
(52) U.S. Cl. ...................... 430/311; 264/406; 264/430; 264/435; 359/326; 257/432
(58) Field of Search .......................... 430/311; 264/406, 264/430, 435; 359/326; 257/432

(56) References Cited

U.S. PATENT DOCUMENTS

| | | | | |
|---|---|---|---|---|
| 5,800,767 A | * | 9/1998 | Byer et al. .................... | 264/430 |
| 5,875,053 A | * | 2/1999 | Webjorn et al. ............ | 359/326 |
| 6,156,255 A | * | 12/2000 | Byer et al. .................. | 264/406 |

OTHER PUBLICATIONS

M. Yamada, et al., "First–Order Quasi–Phased Matched LiNbO₃ Waveguide Periodically Poled by Applying an External Field for Efficient Blue Second–Harmonic Generation," Applied Physics Letters, vol. 62, No. 5, pp.435–6, 1993.

S. Matsumoto, et al., "Quasi–Phase Matched Second Harmonic Generation of Blue Light in Electrically Periodically Poled Lithium Tantalate Waveguides," Electronics Letters, vol. 27, Issue 22, pp. 2040–2042, 1991.

\* cited by examiner

*Primary Examiner*—Shean C. Wu
(74) *Attorney, Agent, or Firm*—Lumen Intellectual Property Services, Inc.

(57) ABSTRACT

A method for fabricating periodically poled structures. The method produces an electric field within a ferroelectric substrate by applying a voltage waveform to an electrode structure disposed on a surface of the substrate. The waveform raises the electric field magnitude to a level substantially greater than that required to reverse domains within the substrate. The waveform then lowers the voltage such that the electric field has a value at which a domain wall velocity is most sensitive to changes in the field. The waveform maintains the electric field value until a current through the substrate drops substantially. The electric field is then lowered to a value below a level required to sustain domain wall motion, but greater than a level below which backswitching occurs. The electric field is then lowered to zero in such a way as to prevent backswitching. Alternatively, the electric field is maintained for a time t determined by t=x/v, where x is a domain wall half-width and v is a domain wall velocity. Subsequently, the waveforms lower the voltage to zero.

27 Claims, 9 Drawing Sheets

METHOD FOR FABRICATING EFFICIENT SOURCES OF ELECTROMAGNETIC RADIATION

CROSS-REFERENCE TO RELATED APPLICATIONS

This application is based on Provisional application No. 60/112,385 filed Dec. 14, 1998, which is herein incorporated by reference.

STATEMENT REGARDING FEDERALLY SPONSORED RESEARCH OR DEVELOPMENT

This invention was supported in part by grant number ONRN0001492J1903 from the Office of Naval Research (ONR). The Government has certain rights in the invention.

FIELD OF THE INVENTION

This invention relates generally to light sources. More particularly, it relates to electric light sources.

BACKGROUND ART

Highly efficient and economical multi-watt red, green, and blue lasers are desirable for display applications. Unfortunately, existing semiconductor lasers are generally not available at power levels and wavelengths suitable for display applications. Displays for consumer applications require reliable multi-watt sources that can be manufactured in high volumes. Although many factors influence manufacturing costs, some of the most significant are the number of parts and alignment steps, tight tolerances, and the cost of components.

The wavelengths of currently available lasers can be converted to those required for displays using nonlinear optics. Nonlinear optics has been used to produce wavelengths throughout the visible spectrum, over a wide range of powers, with optical-to-optical efficiencies well in excess of 50%. However, the relatively low nonlinear coefficient of available materials requires resonant or mode-locked frequency conversion schemes that are incompatible with the economics of displays. Alternatively, nonlinear waveguides may be used, but these have limited power-handling capability. To meet the needs of display applications, a new class of nonlinear optical materials employing quasi-phase-matching is required.

To reduce the number of parts and alignment steps, a bulk single-pass configuration for second harmonic generation (SHG) using one infrared semiconductor laser and one nonlinear crystal, is preferred over a resonant design. Generally, the semiconductor laser and nonlinear crystal are the costliest components in this source. Semiconductor laser bar prices have declined at approximately 30%/year since 1985. Single-emitter multi-watt semiconductor lasers are expected to follow a price-volume relationship similar to that of laser bars. The cost of the nonlinear crystal is also strongly tied to volume and the stability of the fabrication technology. Consequently, it is more reasonable to modify existing nonlinear optical materials than to develop new materials. Lithium niobate ($LiNbO_3$), often referred to as "the silicon of nonlinear optics," is an excellent material for SHG for two reasons. First, $LiNbO_3$ is already produced at a volume of 40 tons per year for consumer applications (cellular phones and televisions) using a very stable fabrication technology. Second, $LiNbO_3$ is transparent from 350 nm to 5000 nm, providing low loss for both the fundamental and harmonic for visible light generation. Finally, $LiNbO_3$ has nonlinear coefficients for visible light generation among the highest of all inorganic materials.

While $LiNbO_3$ is an attractive material because of its status as a commodity material, the only component of its nonlinear tensor large enough to satisfy the requirements of display applications is $d_{33}$, having a value of 25.2 pm/volt. While dispersion prevents direct access to the full $d_{33}$ coefficient, quasi-phase-matching (QPM) can provide up to 64% of the full nonlinearity, or 16 pm/volt, making $LiNbO_3$ a very strong candidate for display applications that use QPM.

Essentially QPM is a technique that compensates for the difference in phase velocity between the fundamental wave and its harmonic in a nonlinear crystal caused by natural dispersion. In QPM, two waves having different phase velocities shift $\pi$ out of phase relative to one another over a distance called the coherence length. The sign of the nonlinear coefficient reverses every coherence length, causing the locally generated harmonic field to transfer power to the harmonic beam. By compensating for phase-velocity mismatch in this way, all elements of a crystal's nonlinear tensor can be accessed throughout the entire transparency range.

Two other potential materials in which QPM has been demonstrated for visible light generation are $LiTaO_3$ and $KTiOPO_4$ (KTP). $LiTaO_3$ has a normalized room temperature conversion efficiency of 0.83%/(watt.cm), below that required for bulk single-pass 1064 nm SHG. However, for 852 nm SHG, $LiTaO_3$ has a normalized conversion efficiency of 1.8%/(watt.cm) and would be suitable for that application. KTP has a normalized conversion efficiency for 1064 nm SHG of 1.7%/(watt.cm). To achieve 25% single-pass conversion efficiency of a one watt fundamental, a crystal of 3.6-cm length is required; however, the maximum crystal length in production is 3 cm. For 852 nm SHG, KTP's normalized conversion efficiency is 4.1%/(watt.cm), and would be a strong candidate for that application.

Various approaches have been studied to create QPM structures, including use of rotationally twinned crystals, stacking of alternately oriented thin plates, and growth of periodic domain structures in ferroelectrics. For waveguides where QPM is required only at the surface of the crystal, periodic annihilation of the nonlinear coefficient and periodic domain inversion by dopant indiffusion in ferroelectrics have been employed. Periodic domain structures can be formed in ferroelectrics by applying an electric field using lithographically defined periodic electrodes. Yamada, et al. "First-order quasi-phased matched $LiNbO_3$ waveguide periodically poled by applying an external field for efficient blue second-harmonic generation," Applied Physics Letters 62 (5), 435-6 (1993) and S. Matsumoto et al. "Quasi-phase matched second harmonic generation of blue light in electrically periodically poled lithium tantalite waveguides" Electronics Letters Vol. 27, Issue 22 P. 2040-2042, 1991 were the first to report a demonstration of this approach. This last technique is referred to as electric field periodic poling, and is now often referred to simply as periodic poling. ("Poling" refers to the process whereby the spontaneous polarization of a ferroelectric crystal can be reversed under the influence of a sufficiently large electric field. In this application, the term "electric field periodic poling" will be used to differentiate from other periodic poling techniques.)

In both electric field periodic poling and waveguides, lithographic techniques are used to assure the periodicity of the QPM structure. The fabrication of masks for lithography typically employs interferometric feedback control. This type of control can limit the positional error of any feature over the dimension of the mask to less than a quarter-wavelength of radiation, e.g. 0.16 µm for He-Ne. For a 5-cm-long 5-µm-period grating, this amounts to a maximum period fluctuation of 6 parts in 1 million, resulting in a negligible reduction in conversion efficiency. The ability to define QPM structures with lithographic precision created an opportunity in nonlinear optics to fabricate devices with interaction lengths not possible using non-lithographic techniques.

Previous periodic poling techniques have produced 50-mm-long, 0.5-mm-thick periodically poled LiNbO$_3$ (PPLN) with a 29.75-µm period. For visible light generation using PPLN, many applications would benefit from electric field periodic poling technology capable of producing domain periods below 15 µm in devices at least 1.0 cm long. Domain periods between 6 µm and 7 µm are required for green light generation, and blue light generation requires domain periods between 4 µm and 5 µm. The longest prior PPLN devices for visible light had a period of 4.6 µm, were 6 mm long, and a thickness of 200 µm. Domain pattern quality had decreased as the period was reduced.

Therefore, a need exists in the art for an electric field poling process that accounts for the dependence of domain quality on period and thickness to produce shorter domain periods.

OBJECTS AND ADVANTAGES

Accordingly, it is a primary object of the present invention to provide a model of the electric field periodic poling process in LiNbO$_3$ that predicts poling outcomes and is useful as a design tool. It is a further object to provide an optimized poling waveform. It is an additional object to provide a means for fabricating non-linear crystals that are quasi-phase-matched over their entire length.

SUMMARY

These objects and advantages are attained by a novel method for fabricating a periodically poled structure from a ferroelectric substrate having an electrode structure and an insulator structure. The method produces an electric field within the substrate by applying a voltage waveform to the electrode structure. The waveform raises the electric field magnitude to a level substantially greater than that required to reverse domains within the substrate. The waveform then lowers the voltage such that the electric field has a value at which a domain wall velocity is most sensitive to changes in the field. The waveform maintains the electric field value until a current through the substrate drops substantially. The electric field is typically maintained for a time greater than a relaxation time of the substrate material. Alternatively, the electric field is maintained for a time t determined by t=x/v, where x is a domain wall half-width and v is a domain wall velocity. Subsequently, the waveform may lower the voltage to zero. Preferably the voltage is reduced at rate slower than a rate of relaxation of domains within the substrate.

The method may enhance periodic poling by providing annealing the substrate in oxygen to increase an electrical resistance of the surface. Oxygen may also be provided to the surface of the substrate by coating the surface with a spin-on glass and baking the substrate to form the insulator structure.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

THEORETICAL

The conversion efficiency of the nonlinear crystal has an impact on the total system cost by affecting the power requirements of the semiconductor laser source. A reasonable goal for single-pass conversion efficiency is that it should exceed 25% to avoid excessive laser cost. In the low conversion limit, conversion efficiency n for confocal focusing is given by $$\eta \equiv \frac{P_{2\omega}}{P_{2\omega}} = 16\pi^2 \frac{d_{eff}^2 Z_0}{n_\omega n_{2\omega} \lambda^3} L P_\omega \text{sinc}^2[\Delta k L/2], \qquad \text{Eq. 1}$$

where $P_{2\omega}$ is the power in the second harmonic, $P_\omega$ is the power in the fundamental, $d_{eff}$ is the effective nonlinear coefficient in m/volt, $Z_o$ is the impedance of free space, $\Delta k \equiv k_{2\omega} - 2k_\omega$, $k_{2\omega} \equiv 2\pi n_{2\omega}/(\lambda/2)$, $n_{2\omega}$ is the index of refraction at the harmonic, $k_\omega \equiv 2\pi n_\omega/\lambda$, $n_\omega$ is the index of refraction at the fundamental, $\lambda$ is the fundamental wavelength, L is the length of the nonlinear crystal, and $$\text{sinc}(x) \equiv \frac{\sin(x)}{x}.$$

Note that conversion efficiency is proportional to crystal. length, input power, and the square of the effective nonlinear coefficient. As crystal length is increased, conversion efficiency increases, but the nonlinear conversion process becomes more sensitive to changes in wavelength, temperature, strain, and other factors affecting the difference in refractive indices. In addition to overall variation in the refractive index difference, local variations impose an additional constraint on the maximum useful crystal length. As a result, length alone cannot be used to compensate for either low nonlinearity or low input power.

To estimate the nonlinearity required to produce one watt of 532 nm green light from a four-watt 1064 nm source, consider an example where the nonlinear material has refractive indices of approximately 2 at both the fundamental and harmonic, and the maximum device length is limited to 50 mm. Solving Eq. 1 for $d_{eff}=10$ pm/volt, obtains a normalized conversion efficiency of about 1.25%/(watt.cm). Sources based on bulk single-pass second harmonic generation therefore require crystals with a nonlinear coefficient greater than 10 pm/volt, useful lengths up to 50 mm, and good transparency throughout the visible range. While crystals exist that satisfy two out of three of these requirements, no prior crystals were capable of satisfying all three simultaneously.

PERIODIC POLING METHOD

Figure 1:
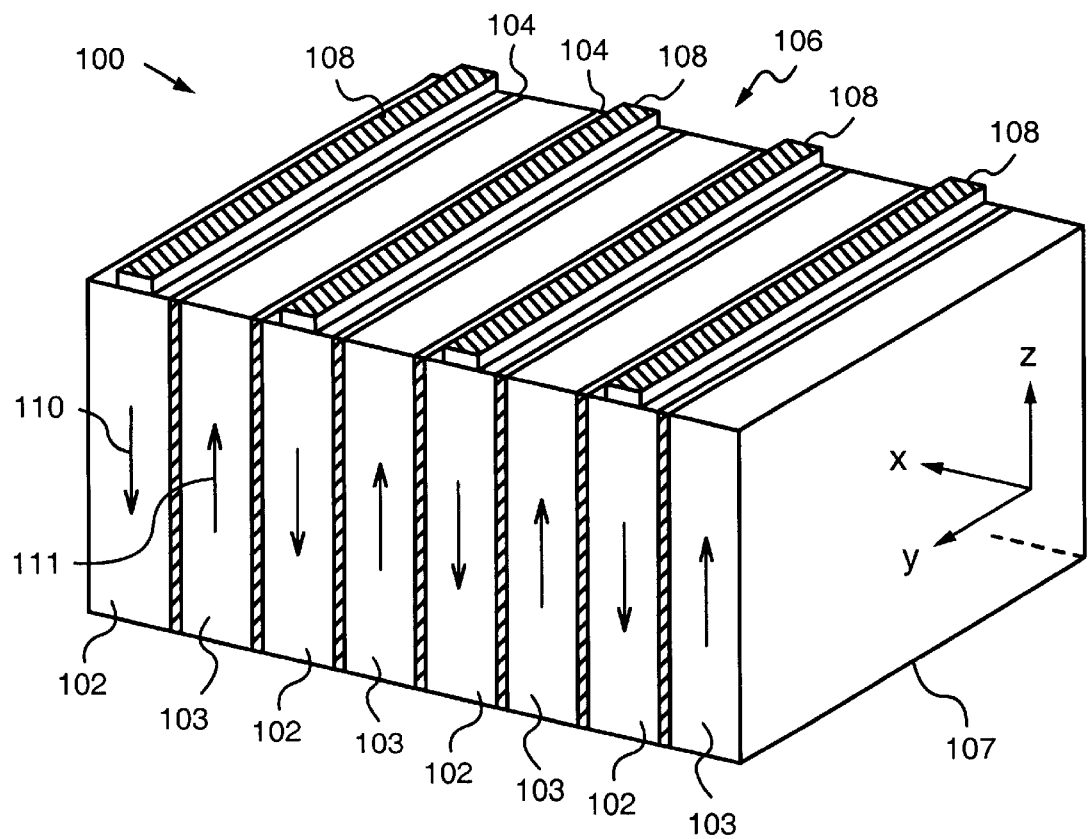
FIG. 1 is a diagram of typical domain configuration of electric fields in a periodically poled non-linear crystal.

FIG. 1 depicts a diagram of domain configuration of electric fields in, periodically poled non-linear material such as a crystal of $LiNbO_3$. A crystal 100 includes a plurality of domains 102, 103 bounded by domain walls 104. Note that domain walls 104 are quite straight and parallel to a z-axis of crystal 100, from the electrode surface into the bulk of crystal. A surface 106 of the crystal is covered with a pattern of electrodes 108. Arrows 110, 111 indicate electric field polarization within domains 102, 103. Note that the polarization in domains 102 underneath electrodes 108 is opposite an original, i.e. unreversed, polarization in domains 103. The electric fields 110 are highly non-uniform near the electrodes 108. Similar behavior can also been seen in $LiTaO_3$. The domains 102 have a greater width than electrodes 108, indicating that spontaneous polarization charge was deposited on the surface of crystal 100 between the electrodes. In the absence of conduction this charge would be unscreened, and would give rise to fields of the sign opposite to that required for domain reversal.

The present method for producing a crystal of the type shown in FIG. 1 is based on five basic assumptions regarding the domain kinetics.

1. Domain walls are flat and normal to the crystal x-axis.
2. Domain wall motion is governed by the z-component of the electric field averaged over the x-z cross-section of the domain.
3. The functional relationship between domain wall velocity and the z-component of the electric field averaged over the x-z cross-section of the domain is the same everywhere in the crystal.
4. Nucleation occurs exclusively at the electrodes.
5. The dielectric relaxation times of the ferroelectric and insulator are assumed to be much longer than the poling time.

With these assumptions, domain kinetics during electric field periodic poling of crystal 100 according to an embodiment of the method of the present invention are described in six stages as shown in FIGS. 2(a)–2(f). Typically crystal 100 is a non-linear material such as a ferroelectric. Suitable ferroelectrics include lithium niobate ($LiNbO_3$). Crystal 100 can be prepared with periodic electrodes and lithographically defined electrode structures 108 with periods from 1.75 $\mu$m to 15 $\mu$m.

Electrodes 108 can be any metal, such as aluminum, titanium, tantalum, chrome, nickel, or nichrome. Electrodes 108 can be deposited by any conventional technique, such as evaporation or sputtering. The electrode pattern may be defined using lift-off, the electrode pattern was over-coated with photoresist or spin-on-glass. Poling is typically performed in a dielectric oil. In other cases, samples were prepared with metal deposited over patterned photoresist, contacting the surface through the patterned openings. Crystal 100 is typically clamped between o-rings. The electrode pattern may be over-coated with an insulator, with an opening in the insulator provided to allow electrical contact with an electrolyte. In the experimental study of the stages of domain kinetics, uniformly electroded samples were prepared with uniform electrolyte contacts. The contacts were applied to the polar faces of 6.0-mm-square single-domain samples with thickness ranging from 250 $\mu$m to 1 mm. Electrolyte solutions were chosen because metallic contacts resulted in observations highly dependent on the choice of metal and its method of application; experimental outcomes were not dependent on the choice of electrolyte. Suitable electrolytes include solutions of lithium chloride or sodium chloride in deionized water, pure deionized water, tap water, isopropanol, and methanol.

A voltage, of appropriate polarity, applied to electrodes 108 produces anti-polar electric fields (electric fields whose direction is opposite to that of the spontaneous polarization) in crystal 100. Typical field magnitudes range from 19 kV/mm to 60 kV/mm. Pulse lengths typically range from 100 ns to 3 h. A Trek Model 20/20 high voltage amplifier was used for pulses 10 $\mu$s and longer, and a Hughes Crossatron 45 kV switch was used for shorter pulses. After poling pulses are applied, domains were revealed on samples using hydrofluoric acid at room temperature for 5 min. Use of this observation technique is permissible only if the domain size remains unchanged after the poling pulse terminates. The poling pulses were designed to allow the domains to stabilize without further growth.

Figure 2A:
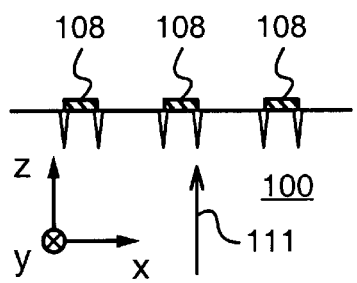
FIGS. 2(a)–2(f) depict stages of domain kinetics during electric field periodic poling of a non-linear crystal.

In FIG. 2(a) a pulsed voltage is applied to electrodes 108. Initially crystal 100 has a polarization direction indicated by arrow 111. Domain nucleation typically begins at the edges of electrodes 108. Each individual domain 102 has a single starting point, called the nucleation site. Nucleation sites are typically located on both sample faces. Nucleation sites tend to be grouped in clusters, in arcing or linear paths, or near domains already in the wall propagation stage. Nucleation site density (NSD) is field- and time-dependent for fields below 21 kV/mm. For fields from 24 kV/mm to 64 kV/mm and pulse durations down to 100 ns, NSD is independent of field strength and pulse width.

Periodic electrodes 108 tend to cause a significant increase in NSD compared to uniform electrolyte contacts. The domains typically nucleate along the edges of electrodes 108 with a linear density of 0.1–2 nuclei/$\mu$m. The electrode/insulator configuration and the choice of electrode material strongly influence NSD. In a preferred embodiment, electrodes 108, are sputtered nichrome stripes over-coated with spin-on-glass.

Figure 2B:
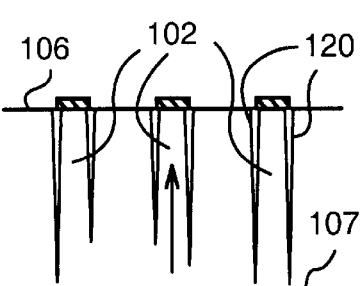

As shown in FIG. 2(b), domain tips 120 propagate toward an opposite face 107 of crystal 100. Tips 120 propagate parallel to a polar axis of crystal 100, dominating the growth of the domain in this stage. As tips 120 propagate, the diameter of a base of domains 102 increases. The ratio of tip velocity to the wall velocity at the base is between about 100:1 and about 1000:1.

During tip propagation, domain tips 120 from adjacent electrodes 108 can merge, leading to the formation of a single large domain 102 instead of two separate domains. The merging of domains reduces the effective nonlinearity of PPLN and occurs mainly during the tip propagation stage. One source of domain merging is substrate inhomogeneity, which causes domain tips to wander from a strictly z-directed path.

Another important source of domain merging is tip-to-tip interactions. When two domain tips are in close proximity, the unscreened polarization charge on their walls slightly increases the electric field in the region between them. This increased field leads to an increased growth rate on the walls closest to the nearby domain. The increased growth rate causes the paths of the domain tips to merge. In electric field periodic poling, this type of merging is preferred between closely spaced tips generated by the same electrode stripe. However, under conditions of low NSD where the closest tips are those generated by separate electrode stripes, merging results in the loss of a domain and reduction of the effective non-linearity.

For electrode periods >15 $\mu$m, merging happens almost exclusively under the electrodes, depending on the field used during poling. Below 10 $\mu$m, the frequency with which domains from adjacent electrodes merge increases rapidly. The depth at which domains from adjacent electrodes merge is ~100 $\mu$m.

Figure 2C:
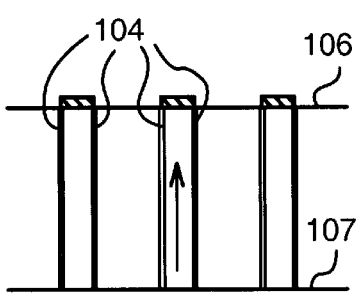

In FIG. 2(c) tips 120 terminate at the opposite face 107 of crystal 100. When the tips of isolated domains 102 contact opposite face 107 of the crystal, walls 104 of domains 102 straighten on a time scale shorter than about 1 $\mu$s, creating a hexagonal shape with the same diameter as that of the original nucleus. During this brief stage, domains 102 greatly reduce their electrostatic interaction with neighboring domains as a result of their walls 104 becoming parallel to the z-axis. When a pair of domain tips 120 merge as they propagate through crystal 100, the termination event results in a larger domain 102 than would occur in the absence of merging, due to the large energy penalty associated -with tilted domain walls 104. The close proximity of domain tips 120 generated by a single stripe electrode 108 gives rise to merging under the electrode, and the tip termination stage contributes to complete reversal of the domain under the electrode as shown in FIG. 2(d).

Figure 2D:
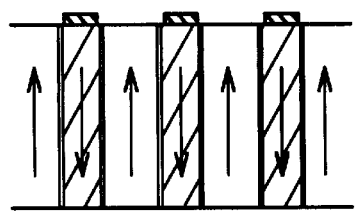

In FIG. 2(d) domains 102 rapidly coalesce under electrodes 108 to form a larger domain when their walls 104 touch. The velocity of the domain wall in the region where two domains made contact is generally many times larger than the domain wall velocity elsewhere. Samples with periodic electrodes 108 benefit from rapid coalescence, since it provides a means for domains 102 to fill in the space under electrodes 108 before they begin to spread outward.

Figure 2E:
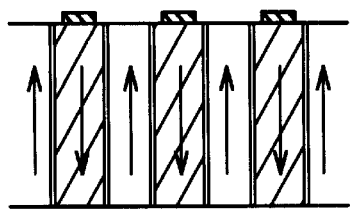

When tip 120 of an isolated domain 102 terminates at opposite face 107 of crystal 100, the diameter of the domain at both faces rapidly equalizes. Domain walls 104 then propagate out from under electrodes 108, as shown in FIG. 2(e). By obtaining the relationship between domain wall velocity and electric field for samples with uniform electrodes 108, domain kinetics during the wall propagation phase of electric field periodic poling can be calculated. In addition, the relationship can identify whether there is a field at which domain wall velocity is most sensitive to changes in the field.

Figure 3:
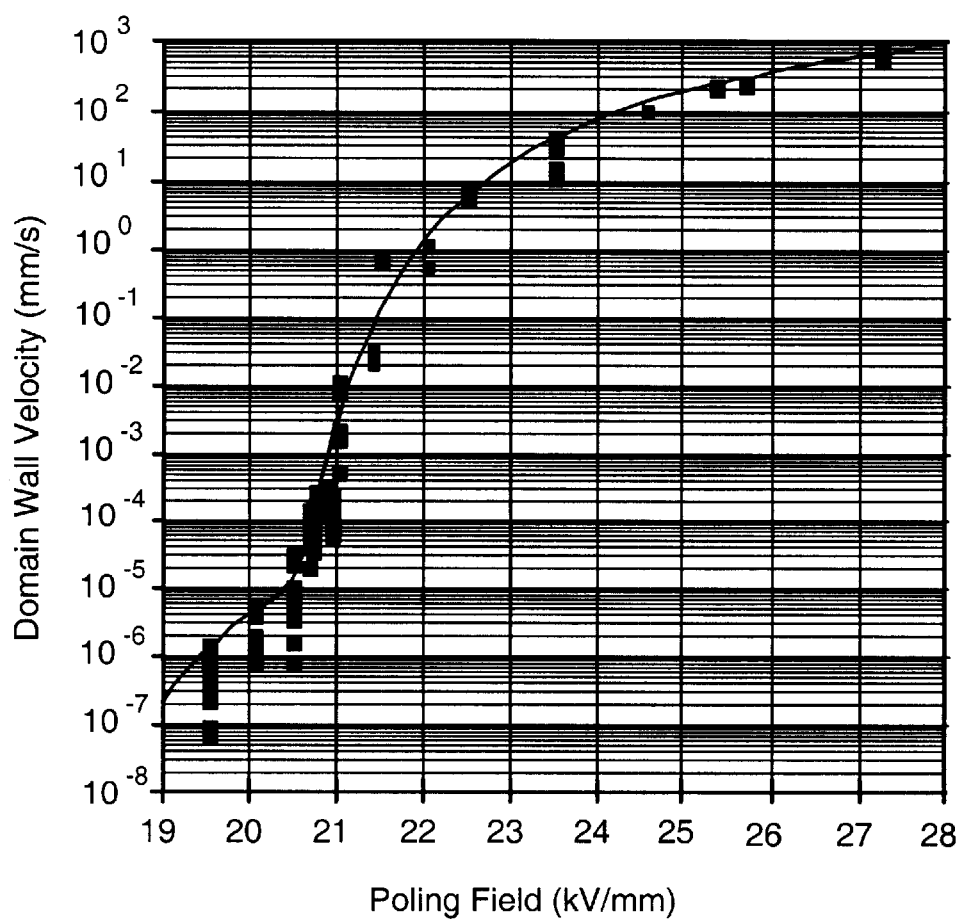
FIG. 3 Depicts a graph of domain wall velocity versus poling field.

FIG. 3 depicts a graph of domain wall velocity versus poling field for a sample of LiNbO$_3$. The squares are experimental data and the solid curve is the fit based on an equation discussed below. For fields between 19 and 28 kV/mm, the domain wall velocity varies over 10 orders of magnitude in this interval. The scatter in data points at fields below 21 kV/mm shows that some domains nucleate before others, indicating that nucleation is a time-dependent process at low fields. Generally, the longer the field is applied, the greater the number of nucleation sites. The relative lack of scatter above 21 kV/mm shows that nucleation occurs on a time scale much shorter than the pulse duration with increasing field and that the number of nuclei-per-unit-area does not increase with increased pulse length in this regime. Samples poled at fields up to 64 kV/mm exhibit no noticeable increase in nucleation site density, and all the domains on each sample were nearly equal in size. It is interesting to note that, at fields above ~30 kV/mm, the domains take on a triangular shape. This suggests that there are only a finite number of nucleation sites available in LiNbO$_3$. Previous models indicate that nucleation rate is proportional to exp ($\Delta W/kT$), where $\Delta W$ is the energy associated with domain nucleation, k is Boltzmann's constant, and T is temperature. This measurement suggests that all available nucleation sites are activated at the beginning of the poling pulse for fields above 24 kV/mm.

In BaTiO$_3$, domain wall velocity data has been described well by a fitting function of the form:

$$v(E) = v_\infty \exp(-\delta/E) \qquad \text{Eq. 2}$$

This function however cannot fit the apparent inflection in the graph of FIG. 3 at around 20.5 kV/mm. The data appear to be generated by a superposition of two functions similar to Eq. 2, differing in that each function's domain wall velocity goes to zero for some positive non-zero value of electric field. Thus, the fitting function applied to this data is $$v(E) = \Phi(E - E_1)v_1\exp\left(-\frac{\delta_1 E_1}{E - E_1}\right) + \Phi(E - E_2)v_2\exp\left(-\frac{\delta_2 E_2}{E - E_2}\right) \qquad \text{Eq. 3}$$

where $\Phi$ is the heavyside step function and the fitting parameters are given in Table I below.

TABLE I

Fitting parameters for velocity-field function.

| | |
|---|---|
| $E_1$ = 19.4 kV/mm | $E_2$ = 15.0 kV/mm |
| $v_1$ = 16.3 m/sec | $v_2$ = 362 $\mu$m/sec |
| $\delta_1$ = 1.29 | $\delta_2$ = 3.83 |

Figure 4:
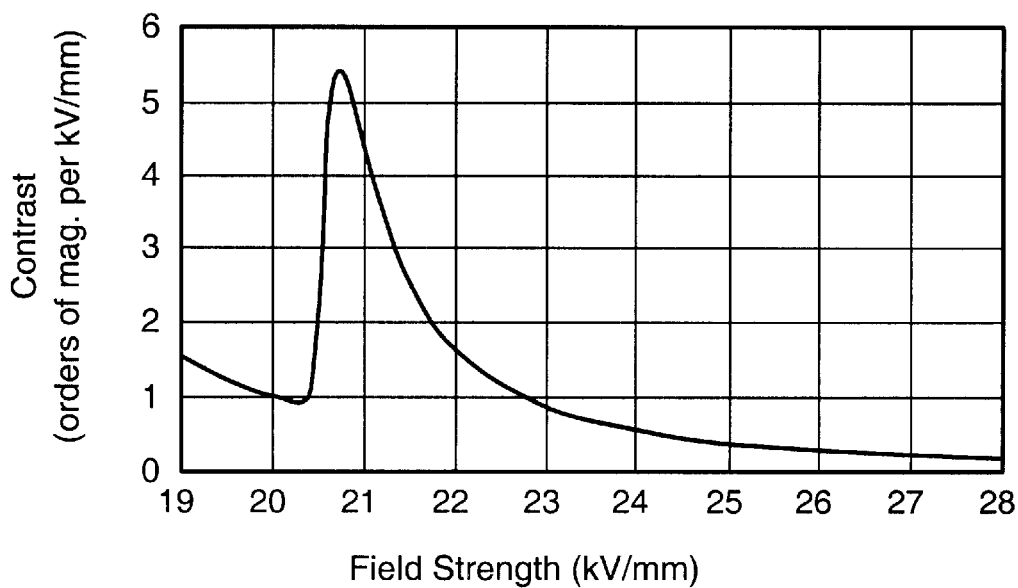
FIG. 4 shows a typical contrast curve for a velocity-field function.

Eq. 3 can be used to determine the field at which domain wall velocity is most sensitive to changes in the average field in the crystal. As domains 102 spread out from under the electrodes, the unscreened spontaneous polarization charge deposited on surface 106 of the crystal lowers the average field seen by domain 102, slowing its growth. By periodic poling with the field at which domain wall velocity is most sensitive to changes in the average field, a strong negative feedback mechanism is created, preventing the excessive spreading of domains 102 beyond electrodes 108. This optimum field can be determined from the peak of a derivative of the logarithm of Eq. 3, also referred to as a contrast curve. FIG. 4 shows an exemplary contrast curve for a $LiNbO_3$ sample. The curve in FIG. 4 shows that domain wall velocity is most sensitive to slight variations in the applied field at 20.75 kV/mm, varying 5.5 orders of magnitude per kV/mm at that field.

Figure 2F:
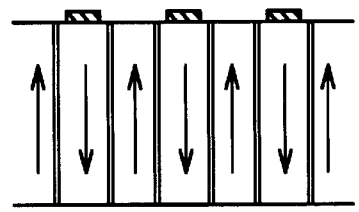

Eventually, new domains 102 stabilize as shown in FIG. 2(f). Newly formed domains 102 can exhibit a time-dependent coercive field. Typically, this field is initially ~−17.5 kV/mm and decays in ~60 ms to 0 kV/mm. A positive value of the coercive field indicates that the applied field opposes the direction of the spontaneous polarization, which is the usual situation in ferroelectric materials. A negative value indicates that the direction of the applied field causing domain reversal is the same as that of the spontaneous polarization. Preferably, the initial value of the coercive field is less than the negative value of the applied field. The initial value of the coercive field and the time required to reduce the field to zero are typically material-dependent parameters.

For example, in the case of newly formed domains in $LiNbO_3$, a field in the same direction as the spontaneous polarization with a magnitude of 17.5 kV/mm or more is required to maintain domain orientation. Reducing the externally applied field to 0 kV/mm in less than 60 ms will cause domains to flip back in a process called 'backswitching'. Within one day of domain reversal, the coercive field approaches ~+19 kV/mm, and remains unchanged even after several days at room temperature. Myers in Quasi-phasematched optical parametric oscillators in bulk periodically poled lithium niobate (Standford University Doctoral Dissertation, 1995), p. 193 reported that heating for 1 h at 120° C. restores the coercive field to its original value, 21 kV/mm. He also observed that domains remain stable at temperatures at least as high as 800° C.

During the formation of periodically poled structures, it is important that poling comes to completion before the applied field begins to decrease. After poling is complete, the current delivered to the sample should stop, with the possible exception of leakage current in the poling fixture. It is possible to ascertain from the poling waveform whether leakage is a significant contributor to the current waveform by analyzing the proportionality between the voltage and current waveforms. Another source of current is displacement current associated with the changes in voltage across the sample. Finally, electrical noise and discretization errors contribute to the current waveform. Fortunately, electrical noise of sufficient amplitude coupled with a sufficiently high sampling rate can be used to digitally remove discretization errors. A digital sampling oscilloscope, such as a model 9304M, made by Lecroy, of Chestnut Ridge, N.Y., may be used to capture and save the waveforms for later processing.

In electric field periodic poling, the poling waveform should be designed to ramp from the poling voltage to zero in 60 ms or longer to suppress backswitching. However, the electrostatics of periodic poling give rise to the possibility that some backswitching in the vicinity of the electrode edges may be difficult to avoid. The lack of screening on the $LiNbO_3$ surface between the electrodes results in anti-polar fields that are increased due to relaxation of the built-in field. These anti-polar fields can nucleate backswitching at the electrode edges.

In electric field periodic poling, the main objective is to obtain a specified domain period and duty cycle with acceptable uniformity throughout the volume of the crystal. While the domain period is assured by the lithography that produces the electrode patterns, many factors influence duty cycle uniformity. Good duty cycle uniformity is important because it contributes to the efficiency of QPM devices and, in the case of photorefractives like $LiNbO_3$, to resistance against photorefractive damage when a 50% domain duty cycle is employed. RMS duty cycle errors must be maintained below 37.5% to achieve at least 50% of ideal conversion efficiency. To achieve resistance to photorefractive damage comparable to $MgO:LiNbO_3$, we estimate that RMS duty cycle errors need to be kept below 1%.

To maximize duty cycle uniformity and obtain the required mean duty cycle, two strategies are employed. The first is to design an electrode and insulator geometry and poling waveform that minimizes the influence of defects. The second is to eliminate defects through advancements in fabrication technology.

Figure 5:
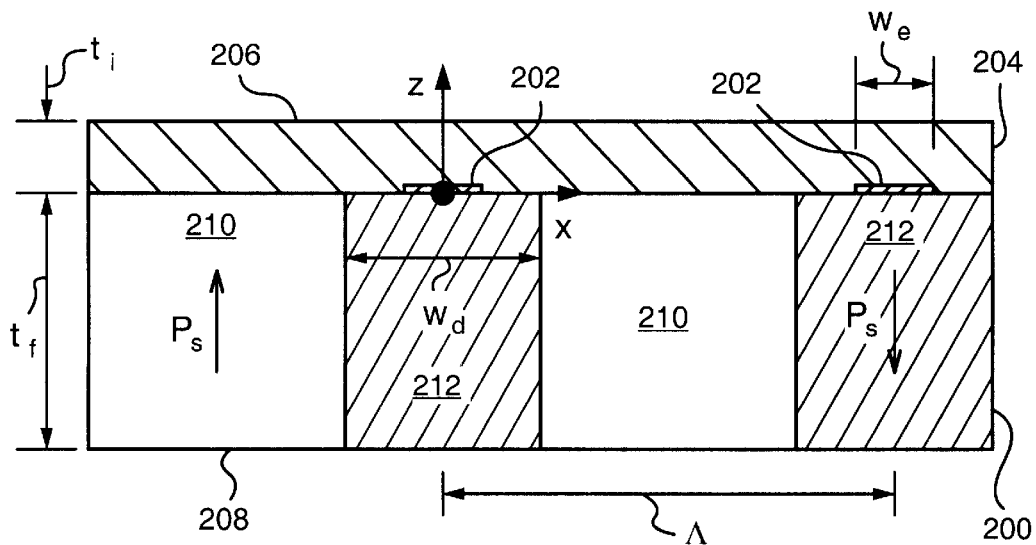
FIG. 5 depicts a cross-sectional view of a poling configuration and variables used to calculate fields and potentials according to an embodiment of the method of the present invention.

FIG. 5 depicts a cross-sectional view of a poling configuration and variables used to calculate fields and potentials. A ferroelectric material 200 with a periodic array of thin metal electrodes 202 lithographically defined on its +z face and over-coated with a uniform thickness insulator 204. Electrodes 202 have width $w_e$. The potential of electrodes 202 is $v_e$. The z-axis is parallel to the z-axis of the original single-domain ferroelectric. An exposed surface 206 of the insulator (at z=ti) is held at a uniform covering potential, $v_c$, typically using an electrolyte contact. An exposed surface 208 of the ferroelectric, the minus z-face, (at z=−$t_f$) is held at the reference potential, 0 volts, also typically using an electrolyte contact. In FIG. 5, the direction of the spontaneous polarization $P_s$ is shown for both un-reversed regions 210 and reversed regions 212 of ferroelectric material 200. Reversed regions 212 are commonly referred to as domains, although this term generally applies to regions of either sign of spontaneous polarization. The domains have width $W_d$. The domain duty cycle is defined as $DC_d \equiv w_d/\Lambda$ and the electrode duty cycle is defined as $DC_e \equiv w_e/\Lambda$.

A computational model permits simulation of the poling process. Through simulation, design parameters can be iterated until a design is obtained that achieves the desired domain duty cycle and has a low sensitivity to defects.

The kernel of the computational model is an equation yielding domain wall duty cycle as a function of time, referred to as the equation of domain wall motion, $$DC_d(t) = \frac{2}{\Lambda} \int_0^t v(E_0(DC_d(\tau); u)) d\tau + DC_d(0), \qquad \text{Eq. 4}$$

where $DC_d(t)$ is domain duty cycle as a function of time t, $v(E)$ is domain wall velocity as a function of average field given in Eq. 4, $E_{0(DCd}; u)$ is the average field in the ferroelectric as a function of domain duty cycle, u is a vector of geometric and dielectric parameters and the poling waveform, and $\Lambda$ is the domain period. The subscript "d" in $DC_d$ indicates domain duty cycle, as distinguished from the subscript "e" in $DC_e$, which indicates electrode duty cycle. The kernel is used to iterate on the parameters in u until the desired duty cycle is least sensitive to variations in both u and the poling pulse duration.

The design process is essentially a numerical optimization procedure. It begins with a guess for u and $DC_d = DC_e$. Next compute the average substrate field using a suitable method and then the domain wall velocity using Eq. 2. Using an appropriate choice of time step, compute the new domain duty cycle. The value of u may be updated if u is time-dependent. The procedure repeats until the desired duty cycle is obtained. The time at which the desired duty cycle is obtained is the nominal poling time associated with u, $t_{pole}$. The sensitivity S of domain duty cycle to variations in u and $t_{pole}$, can be computed using, for example:

$$S(u; t_{pole}) = \sqrt{\left[\frac{\partial}{\partial t}\ln(DC_d(u; t))\right]^2_{t=t_{pole}} + \sum_{i=1}^{n}\left[\frac{\partial}{\partial u_i}\ln(DC_d(u; t))\right]^2_u}.$$ Eq. 5

Iteration of the parameters in u minimizes S. These parameters will result in a minimum-sensitivity design for the desired domain duty cycle.

In the case where u is time invariant (e.g. a constant poling voltage is used), the optimization procedure can be made faster because the computation of domain duty cycle as a function of time can be performed in a straightforward manner. The procedure is as follows: First, generate a vector of domain duty cycles with values between $DC_e$ and 50%. Second, generate a vector of domain wall velocities for each of the domain duty cycles using Eq. 2 and a suitable solution for the electric field in ferroelectric material 200 or insulator 204 due to the potential on electrodes 202. Third, generate a vector of time values using $$t_0 = 0;$$
$$t_i = t_{i-1} + \Lambda\frac{DC_{d_i} - DC_{d_{i-1}}}{v_i + v_{i-1}},$$ Eq. 6 where i=1 . . . rows($DC_d$)−1. The sensitivity is typically calculated at the final time step. The vector u is adjusted as in the more general case.

Given u, domain wall velocity and domain duty cycle can be plotted and compared against experimental data. Note that domain wall velocity is proportional to poling current, and domain duty cycle is proportional to the charge delivered. The model's predictions generally agree with experimental data.

Figure 6:
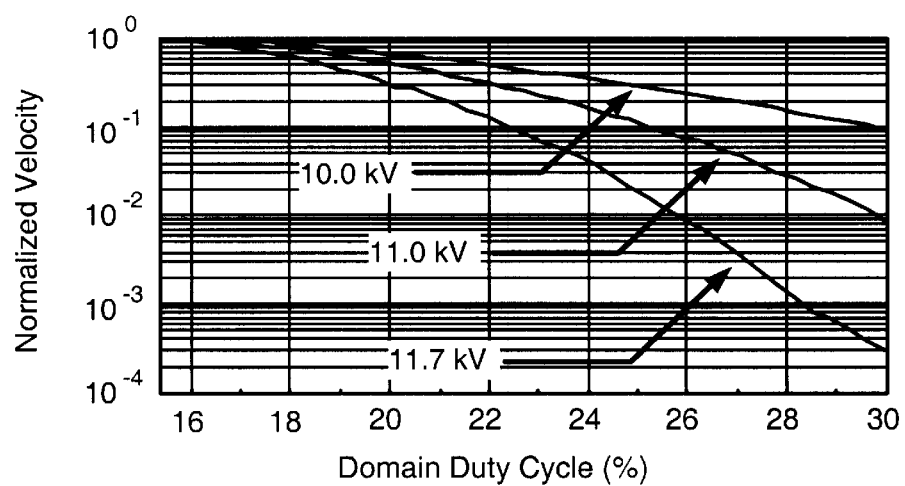
FIG. 6 Depicts a graph of normalized domain wall velocity versus time for three different choices of electrode voltage.

To identify the optimum poling voltage, the fractional change in domain wall velocity from the beginning of poling to the desired domain duty cycle should be used. An example of the effect of poling voltage on the fractional change in domain wall velocity can be seen in FIG. 6. In this example, the sample is 500-μm thick, has a 6.5-μm period with 1-μm-wide electrodes, and is covered with a 0.5-μm-thick spin-on-glass insulator. With an applied voltage of 10.0 kV, domain-wall velocity decreases by a factor of 11 as the domain duty cycle increases from 15% to 30%. With an applied voltage of 11.0 kV, domain-wall velocity decreases by a factor of 110. The optimum poling voltage, 10.7 kV results in a 3000-fold reduction in domain wall velocity. At 10.7 kV, the internal field is initially 21.4 kV/mm and decreases to 20.6 kV/mm as the domain grows. The large change in domain wall velocity is due to the high velocity-field contrast at 20.75 kV/mm. When using the optimum poling voltage, domain motion slows dramatically as it approaches the design-target duty cycle, providing a wide tolerance on the duration of the poling pulse.

Figure 7:
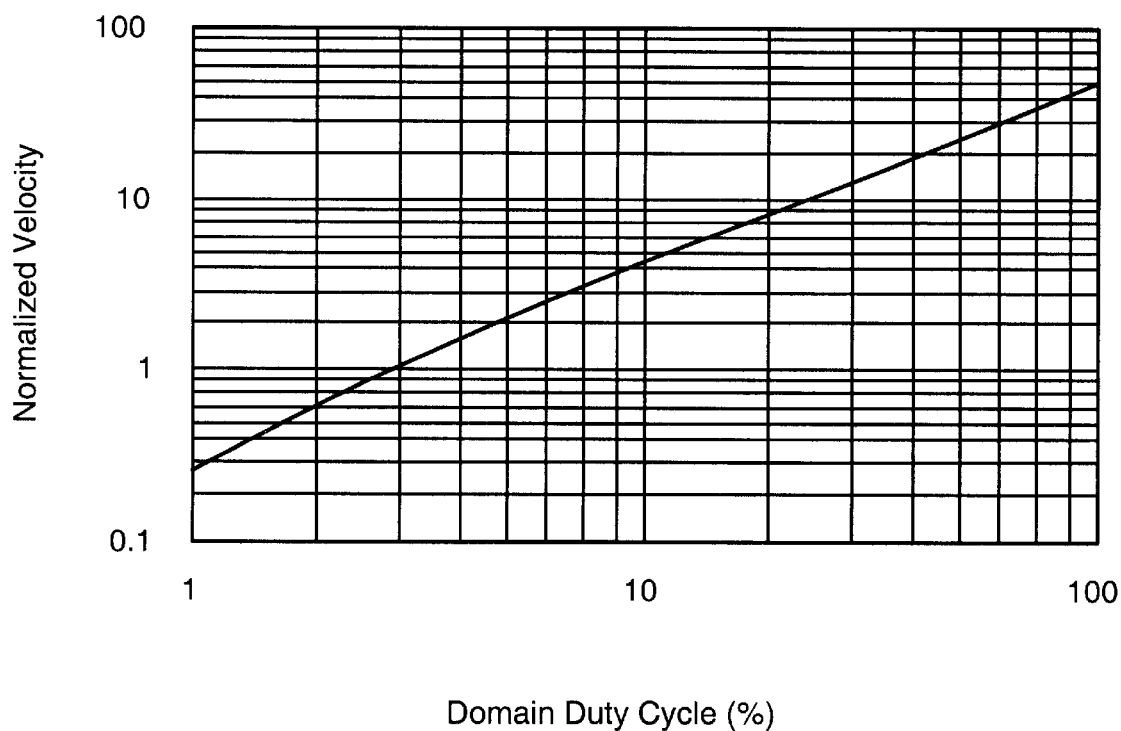
FIG. 7 depicts a graph of electrode width versus electrode period calculated according to an embodiment of the method of the present invention.

The predictive power of the model facilitates the design of electrode and insulator configurations. An important parameter is the electrode width needed to create a 50% domain duty cycle. The computational part of the model provides a means for simultaneously optimizing both the initial poling voltage and the electrode width in order to achieve a specified domain duty cycle. FIG. 7 shows the results of such a calculation, where a 0.5-μm-thick spin-on-glass insulator covers the periodic electrodes and sample surface.

The above model teaches that the insulator used to cover the electrodes and the spaces between them, the interface between the insulator and the $LiNbO_3$ surface, and the near-surface region of the $LiNbO_3$, preferably have low conductivity and high dielectric strength. Conductivity between the electrodes can contribute significantly to the loss of domain pattern quality as domain period is reduced and substrate thickness is increased. Conductivity can be reduced, for example, by annealing the surface of a $LiNbO_3$ substrate in oxygen at a temperature greater than about 150° C. Spin-on-glass materials generally provide adequate dielectric strength and low conductivity.

The model also teaches that domain nucleation site density must increase with the inverse-square of the domain period and have a value on the order of one domain per period-squared in order to maintain domain pattern quality. Experiments show that the choice of electrode material has a large effect on nucleation site density. For example, sputtered nichrome typically produces enough nuclei per unit area to permit fabrication of visible light devices.

Figure 8A:
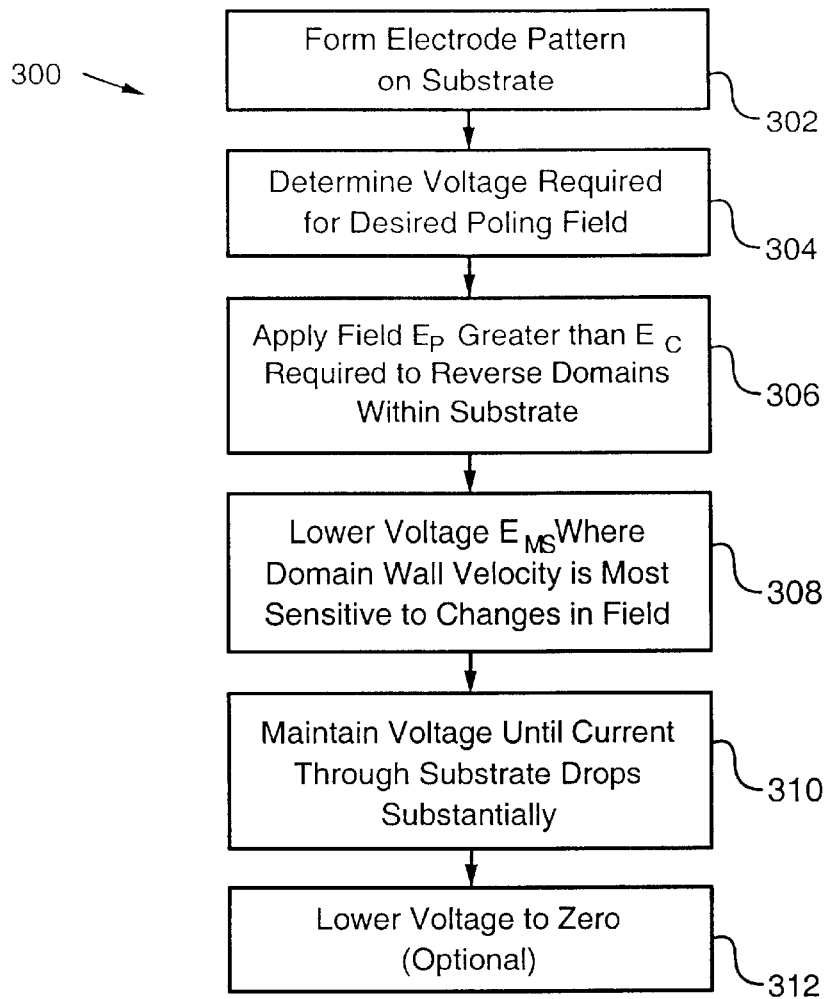
FIG. 8a depicts a flow diagram of an embodiment of the poling method of the present invention.
Figure 8B:
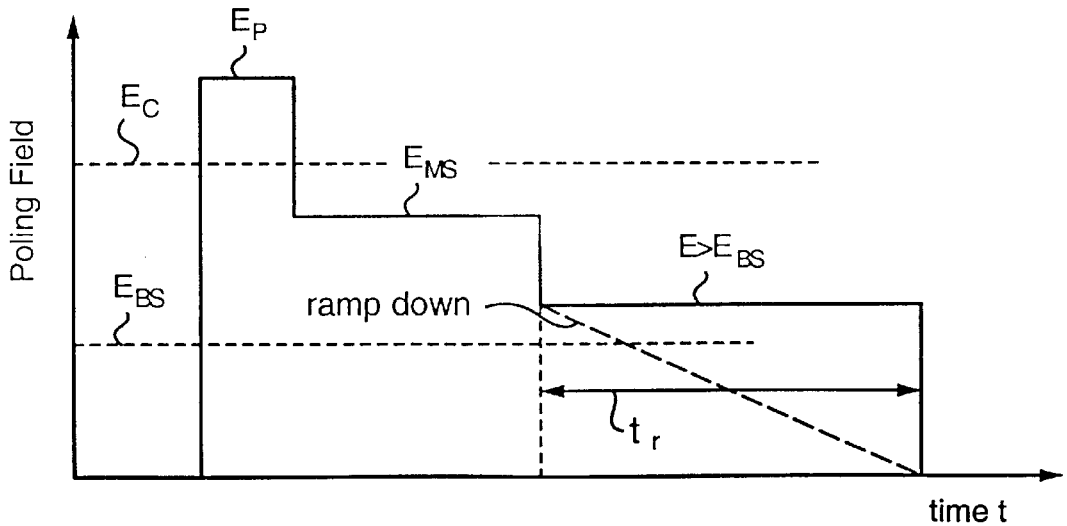
FIG. 8b depicts a poling waveform according to an embodiment of the poling method of the present invention.

In an exemplary embodiment of the method of the present invention, is depicted in the flow diagram of FIG. 8a and the corresponding graph of FIG. 8b. The processing steps of method 300 are described with respect to obtaining a 6.5-μm-domain period over an entire PPLN wafer 0.5-mm-thick and 75-mm in diameter. Previously, excessive domain merging limited the maximum length of PPLN devices with this period to 6 mm. PPLN fabrication with uniform domain pattern quality over an entire wafer permits fabrication of-devices over 50 mm in length. This period quasi-phase-matches 1064 nm Nd:YAG second harmonic generation at ~200° C., a temperature which was expected to be high enough to suppress photorefractive damage.

First, in step 302, an insulator and electrode pattern is formed on a ferroelectric substrate. For example the +z face of an optical grade z-cut lithium niobate wafer may be lithographically patterned with a periodic array of sputtered nichrome stripes with the grating k vector parallel to the crystallographic x axis. Suitable wafers, made by Crystal Technology, Inc., can have a 500-μm nominal thickness and a 76.2-mm diameter. For the purposes of the present invention, Nichrome may comprise any proportion of Nickel and Chromium from 100% Nickel to 100% Chromium. In an exemplary embodiment the nichrome composition is 80% Ni and 20% Cr. Nichrome typically provides the greatest nucleation site density (NSD) of any of the electrode materials tested. The +z face is usually chosen because nichrome exhibited higher NSD on the +z face than the −z face. Nichrome's NSD was approximately one nucleus per period-squared for the 6.5-μm period used here.

A typical electrode pattern uses nichrome stripes 50 nm thick, 1 μm wide, 60 mm long, with a period of 6.5 μm. With 1-μm-wide stripes, the electric-field poling model predicts a domain duty cycle of 35%. Although a 50% domain duty cycle is preferable, a lower duty cycle tends to reduce the coalescence of domains between the electrodes.

To provide high resistivity, the metallized +z face can be overcoated with a 0.5-μm-thick spin-on-glass (Allied Signal) insulator cured at 350° C. in air for 8 h. Spin-on-glass has a higher resistivity than photoresists baked in the usual manner, and higher dielectric strength than super-baked (180° C.) photoresists. Those skilled in the art will be able to devise other means of increasing the resistivity of the material between the electrodes. An annular electrolyte-contact window, 55 mm in diameter and 2-mm wide, can be opened in the insulator with hydrofluoric acid and a photoresist mask. Additional contact windows may be added to compensate for discontinuous metal stripes caused by defects in lithography.

Next, in step 304 the thickness of the wafer is measured to determine the voltage required for the desired poling field $E_p$, which is greater than a critical field $E_c$ required for domain reversal. The wafer is then loaded into an electrolyte-contacting fixture of a known type. The electrolyte used is typically a saturated solution of lithium chloride in water. The electrolyte uniformly contacts the −z face. On the +z face, the electrolyte uniformly contacts the insulator and the metal stripes were contacted via the electrolyte contact windows.

The assembled fixture is connected to a voltage source and a poling voltage is applied to the wafer at step 306 to apply field $E_p$ to the wafer. One suitable source is a Trek Model 20/20 high voltage amplifier driven by a SRS DS345 arbitrary waveform generator. The Trek is a voltage-regulated high-voltage amplifier with a nominal current limit of 20 mA. The voltage across the contact fixture can be recorded using the Trek's voltage monitor output and a LeCroy 9304M oscilloscope. The current through the wafer can be monitored using a 1-kΩ series resistor to ground. The applied voltage establishes an electric field having a magnitude greater than that required for domain reversal. For example, the SRS can be programmed to apply 21.5 kV/mm to the wafer to maximize domain NSD. When the poling current rises to the Trek's current limit, the applied field falls to about 20.9 kV/mm.

At step 308 the voltage is lowered such that the electric field within the wafer is a value $E_{ms}$ at which the domain wall velocity is most sensitive to changes in the electric field. The voltage is maintained at step 310 until the current drops substantially, e.g. by about a factor of two, or more. Preferably, the electric field magnitude $E_{ms}$ is greater than a value $E_{BS}$ at which backswitching occurs in the substrate material. It is also preferable that the field be maintained substrate material. For example the pulse may be delivered for 140 ms to pole the material and then stepped to 19.5 kV/rm for 10 ms. The exact timing of the pulse is dependent on the material being poled. Shorter pulses may alternatively be used, e.g., between about 0.001 and about 1.0 milliseconds.

The voltage may then be optionally reduced to zero at step 312. For example, the voltage may be ramped to 0 kV/mm over 60 ms to prevent backswitching as shown by the dashed line in FIG. 8*b*. If the field is ramped down at step 312, it is desirable to reduce electric field at a rate slower than a rate of relaxation of domains within the substrate.

Figure 9:
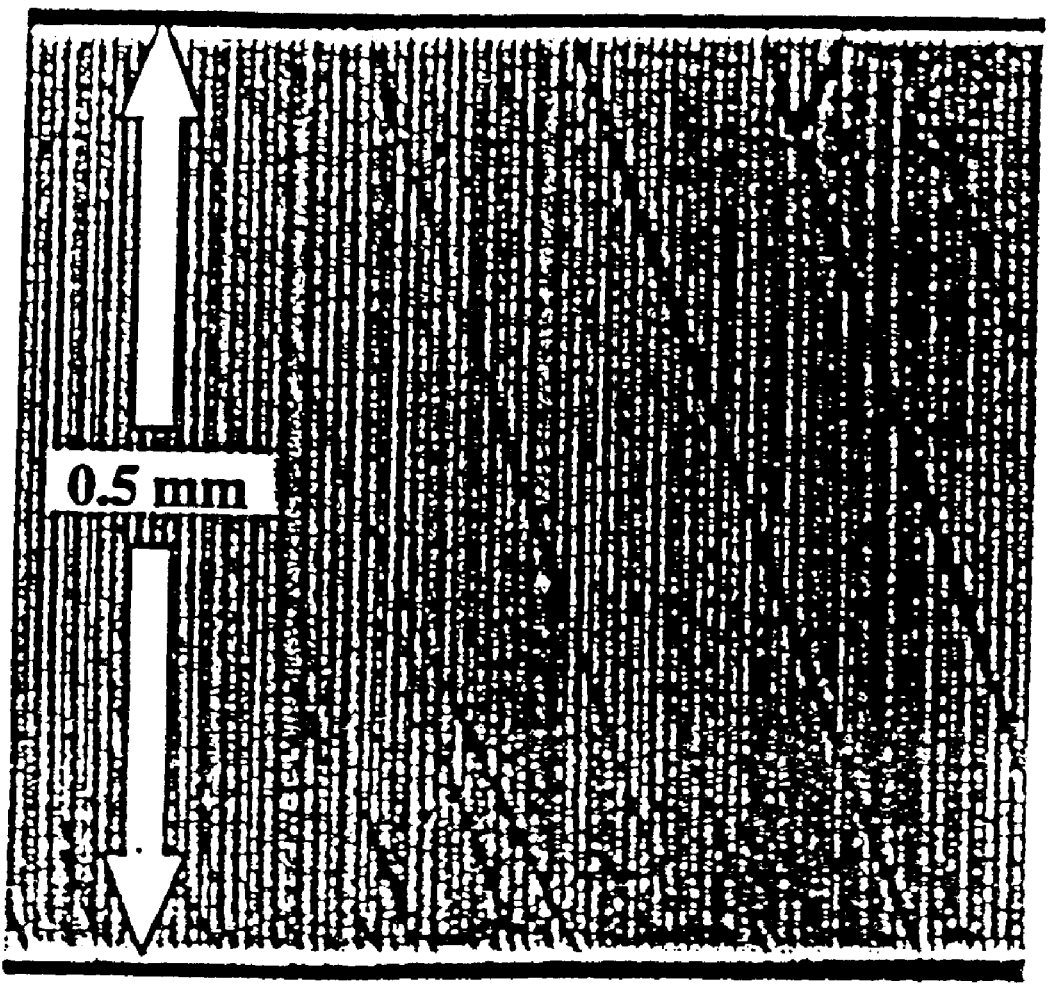
FIG. 9 depicts an etched y face through a 0.5-mm-thick sample of lithium niobate poled in accordance with an embodiment of the present invention.

FIG. 9 shows the etched y face through the 0.5-mm-thick sample. Close visual inspection shows good domain uniformity with a duty cycle close to the 35% predicted by the model. Approximately 5% of the domains merged at depths of 100 to 150 μm.

EXPERIMENTAL RESULTS

PPLN samples 53-mm-long and 0.5-mm-thick with a 6.5-μm-domain period were successfully fabricated using the electric field periodic poling method described above with respect to FIG. 8. This period is suitable for quasi-phase-matched SHG of 532-nm radiation at a calculated phase-matching temperature of 195.6° C. This period is also suitable for use in an optical parametric oscillator (OPO) pumped at 532 nm. The length of these samples provides the conversion efficiency needed for the development of simple coherent sources of visible light and the gain needed for low-threshold OPO's. By measuring the nonlinear-optical performance of these samples, we verified that electric field periodic poling retains the intrinsic properties of $LiNbO_3$ and produces a material suitable for use in visible light applications.

CW single-pass SHG experiments with these samples produced 2.7 watts of 532 nm radiation at 42% efficiency. Singly-resonant OPO (SRO) experiments have achieved a threshold of 930 mW. Temperature tuning from 917 nm to 1266 nm was also demonstrated.

Single-pass cw SHG performance was measured both in the low-conversion limit and in the presence of pump depletion using 1064 nm Nd:YAG input radiation. In the low-conversion limit, the temperature tuning characteristics demonstrated that domain pattern quality, material dispersion, and temperature were uniform over the length of the sample. Measurements of harmonic output power versus fundamental input power demonstrated that the effective nonlinearity was consistent with visual characterization of the domain duty cycle. Increases in fundamental input power resulted in pump depletion and revealed new behaviors at harmonic power levels exceeding 1 watt.

Figure 10:
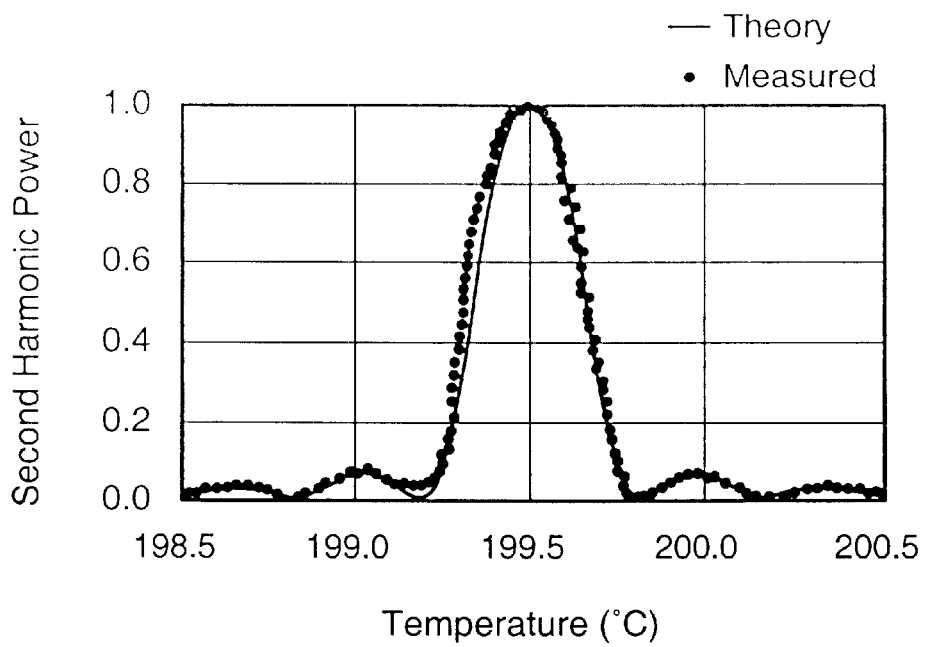
FIG. 10 shows a SHG temperature-tuning curve for a periodically poled sample fabricated according to an embodiment of the present invention.

Seven 53-mm-long, 3-mm-wide samples were cut from the two as described above. The sample endfaces were polished but left uncoated for characterization by SHG. The $TEM_{00}$ output of a Lightwave Series 122 single frequency Nd:YAG laser was loosely focused through several of the samples to determine their phase-matching characteristics and effective nonlinear coefficients. FIG. 10 shows a SHG temperature-tuning curve for one of these samples at 532-nm output power [in arbitrary units (arbs)] versus temperature for Nd:YAG SHG. The dots are experimental data and the solid curve is the theoretical plane-wave curve for a 53-mm sample, shifted to the same peak phase-matching temperature. The good agreement between data and theory indicates that the sample phase matches over the full 53-mm length. The observed phase-matching temperature was 199.5° C., which compares favorably with a predicted phase-matching temperature of 195.6° C. that was determined with a recently published temperature-dependent Sellmeier equation for $LiNbO_3$ and with thermal expansion taken into account. The theoretical phase-matching curve for a 53-mm-long sample was shifted in temperature in FIG. 10 for comparison with the 199.5° C. experimental phase-matching data. The excellent agreement indicates that domain periodicity, material dispersion, and the oven temperature profile were uniform over the entire 53-mm-sample length.

Figure 11:
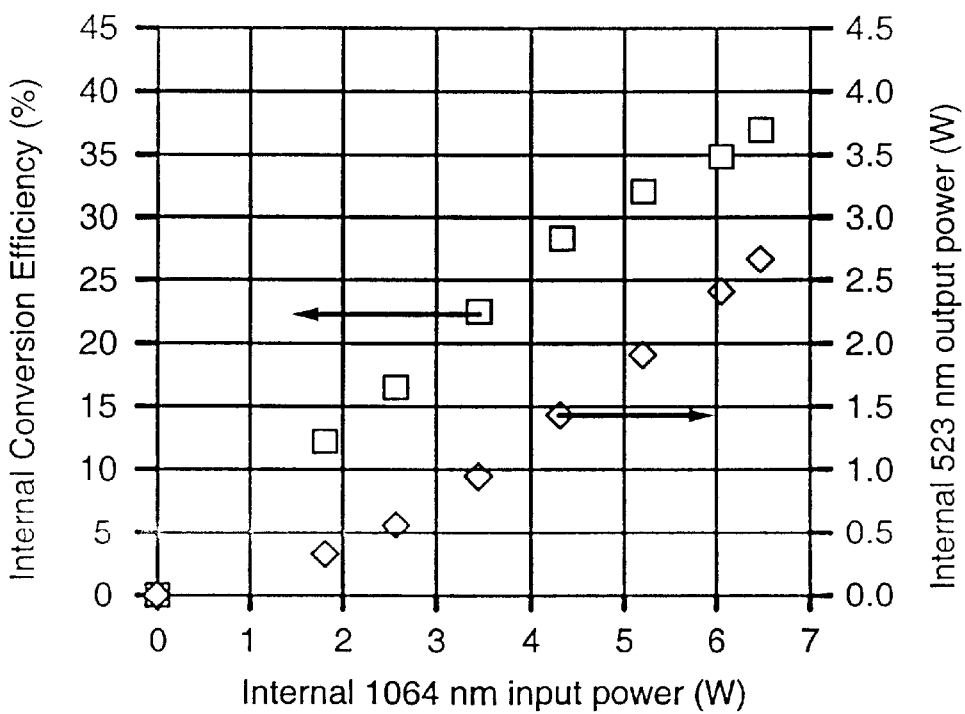
FIG. 11 shows 532-nm output power versus 1064-nm input power for a periodically poled sample fabricated according to an embodiment of the present invention.

These samples were tested at higher power levels by single-pass cw SHG using an 8-watt cw Lightwave Series 220 Nd:YAG laser ($M^2 \approx 1.3$). During these measurements, absorption by the fundamental and harmonic beams gave rise to thermal lensing and apparent shifts in the phase-matching temperature. To compensate for these effects, harmonic output power was maximized for each value of input fundamental power by adjusting the input beam waist size and location and the oven temperature. FIG. 11 shows the generated 532-nm output power versus 1064-nm input power for one sample in which second-harmonic output power was maximized for each value of fundamental input power. All powers are internal to the sample and corrected for Fresnel reflection at the endfaces. Second harmonic power of 2.7 watts was generated for 6.5 watts of input; the internal conversion efficiency was 42%. This conversion efficiency is more than an order of magnitude above that previously obtained for cw single-pass SHG in a bulk material.

Singly-Resonant OPO

The broad tunability of PPLN optical parametric oscillators makes them attractive for spectroscopy, remote sensing, and other applications. By selecting the correct combination of QPM grating period and phase-matching temperature, 532-nm-pumped PPLN OPO's offer the opportunity of producing visible wavelengths while still providing access to idler wavelengths out to 5 $\mu$m. The OPO presented here utilized the 6.5-$\mu$m-domain period PPLN used for the SHG experiments described in the previous section and was tunable from 917 nm to 1266 nm. The high nonlinearity afforded by the 53-mm-long PPLN samples and the quality of their domain structure permitted cw singly resonant operation with a 930 mW internal threshold. Previous 532-nm-pumped QPM SRO's relied on shorter crystals and required use of a Q-switched pump.

Figure 12:
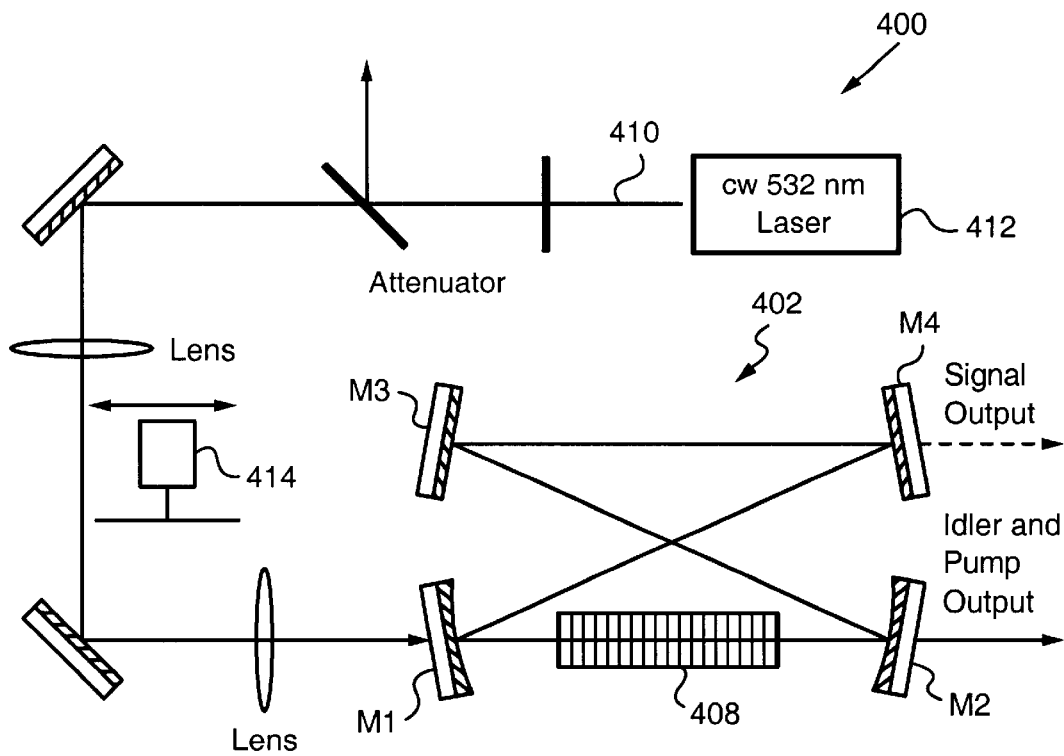
FIG. 12 depicts a schematic diagram of a four-mirror 'bow-tie' ring apparatus utilizing a periodically poled sample fabricated according to an embodiment of the present invention.

The experimental set-up is shown in FIG. 12. The apparatus 400 comprised a four-mirror 'bow-tie' ring cavity 402, which formed an SRO resonator. Cavity 402 comprised two 20-cm radius-of-curvature mirrors M1, M2 and two flat mirrors M3, M4. The total empty-cavity optical path length was 116.6 cm. All four mirrors were highly reflecting from 900–1000 nm, and the combined mirror transmission at 1100–1200 nm was approximately 90%, thus making the cavity resonant only at the signal wavelengths. A PPLN crystal 408 was mounted in an oven located at the waist of the SRO cavity. PPLN crystal 408 was 53 mm long, 0.5 mm thick and had a grating period of 6.5 $\mu$m for first order QPM of the 532 nm pump at temperatures above 198° C. Both end faces of PPLN crystal 408 were antireflection (AR) coated for the wavelengths from 800 nm to 1100 nm. The coatings were evaporation deposited at a substrate temperature of 100° C. to ensure good adhesion when heating the crystal during operation. The SRO cavity mode had a 64 $\mu$m waist and was thus confocally focused in PPLN crystal 408. The SRO optics were not optimized for transmission at 532 nm, with each mirror and AR-coated crystal surface having a pump transmission of ~88%. A pump beam 410 from a laser 412 was mode-matched into cavity 402. Laser 412 was a Spectra Physics Millennia, a 5-watt cw 532-nm single-transverse-mode multi-longitudinal-mode intracavity-doubled diode-pumped Nd:YVO$_4$ laser. The combined pump power loss from the SRO input mirror and the AR-coated PPLN input face was 22.6%.

Absorption of 532 nm pump radiation in PPLN crystal 408 caused thermal lensing and beam pointing instability of the transmitted pump and the idler beams. With increasing 532 nm power, these effects intensified and oscillation became unstable. These losses were reduced by modulating pump beam 410 with a mechanical chopper 414. Chopper 414 had a 50%-duty-cycle at 2 kHz. With lower average 532-nm power in PPLN 408, lower threshold, stable oscillation and fixed spot sizes of the transmitted pump and idler were observed.

Figure 13:
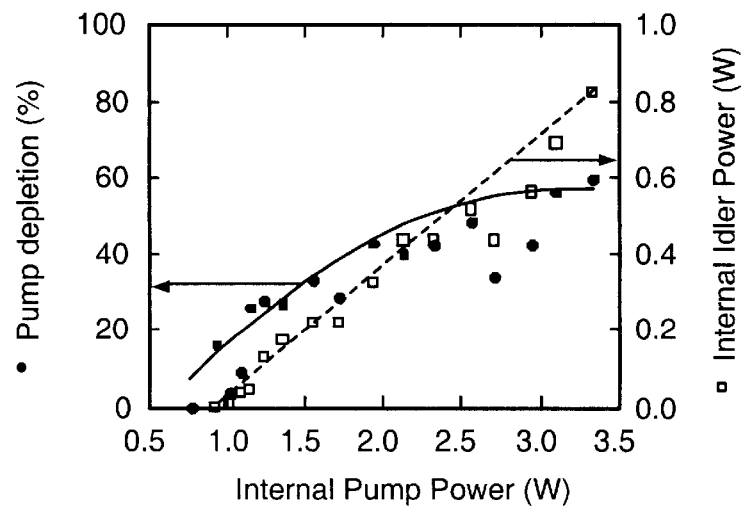
FIG. 13 depicts a graph of pump depletion (circles) and idler power (squares) versus pump power internal to a periodically poled sample in the apparatus of FIG. 12.

FIG. 13 is a plot showing 1192 nm internal idler power (squares) and pump depletion (circles) versus internal pump power. Since the SRO mirrors and PPLN AR coatings were not optimized for transmission at 532 nm, the pump power levels are presented in terms of power internal to the PPLN crystal. Internal idler power is determined as the idler power measured at the output of mirror M2 adjusted by a factor of 4.3 to account for Fresnel and mirror losses. The data in FIG. 13 was taken with the pump modulated as described above. Both pump and idler power levels represent peak power during the approximately square-wave chopper cycle. The oscillation threshold was 930 mW internal to the PPLN crystal, 1.06 watts at the input face of the PPLN crystal, and 1.2 watts at the SRO input mirror. With 3.3 watts of internal pump power, the internal idler power was 820 mW, giving 78% idler quantum slope efficiency internal to the PPLN crystal. Residual loss limited pump depletion to 60% and internal quantum efficiency to 56% for 3.3 watts of internal pump power. The PPLN crystal's large parametric gain of ~8.5%/watt allowed cw SRO operation with two other cw 532 nm pump lasers: a 2-watt Spectra Physics Millennia II, and a 9-watt Nd:YAG Lightwave Series 220 laser that was single-pass frequency-doubled using one of the other 6.5-$\mu$m-period 53-mm-long PPLN samples we fabricated.

Figure 14:
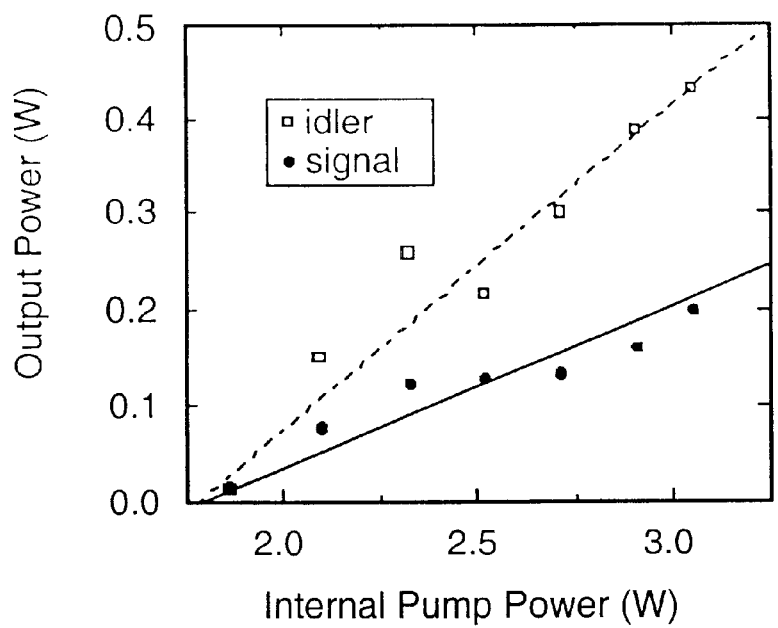
FIG. 14 depicts a graph of output power versus pump power internal to periodically poled sample fabricated for an apparatus of the type depicted in FIG. 12.

Signal power was extracted from the SRO by replacing mirror M4 with a planar 96% reflector at the 961 nm signal wavelength. FIG. 14 shows plots of output power for both the 961-nm signal and 1192-nm idler versus pump power internal to the PPLN for this output-coupled cavity. Both the signal and idler power were measured at the outputs of mirrors M4 and M2, respectively. The pump was again modulated at 2 kHz with a 50% duty cycle, and pump, signal, and idler power levels represent peak power during the chopper cycle. With the added mirror loss the oscillation threshold increased to ~1.8 watts internal to the PPLN. No significant beam-steering or thermal lensing effects were observed in the output beams for internal peak pump powers up to the available 3 watts.

Figure 15:
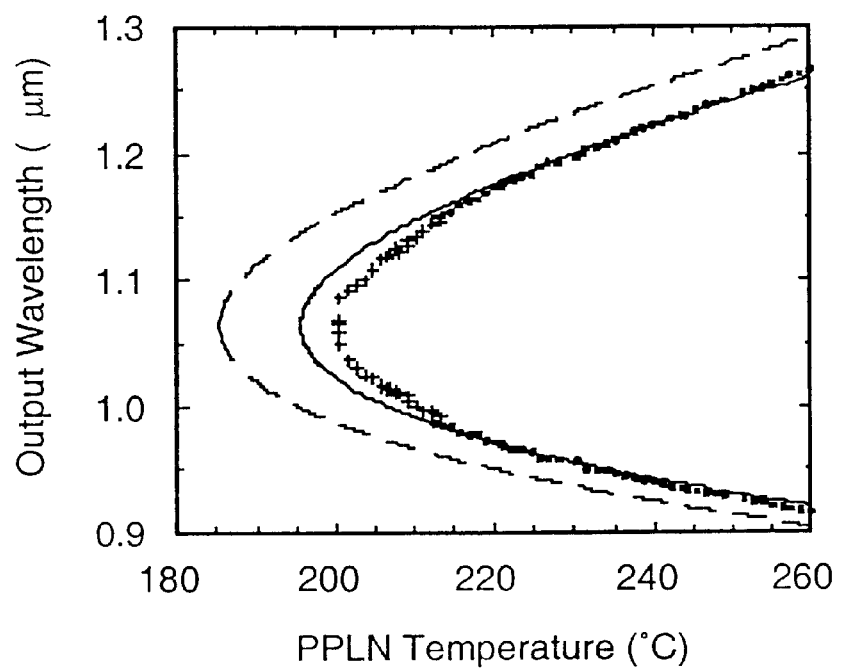
FIG. 15 shows a graph of SRO output wavelengths as a function of the temperature of a PPLN crystal in an apparatus of the type depicted in FIG. 12.

FIG. 15 shows the SRO output wavelengths as a function of the temperature of the PPLN crystal. Using the mirror set described in 12, the PPLN crystal 408 was heated from 212° C. to 260° C., achieving signal tuning from 988 nm to 917 nm, and idler tuning from 1151 nm to 1267 nm (dots). Near-degenerate oscillation, with signal tuning from 1059 nm to 992 nm, and idler tuning from 1065 nm to 1147 nm, was achieved by replacing both flat cavity mirrors with flat 1064 nm high-reflector mirrors and heating the crystal from 200° C. to 213° C. (crosses). Double resonance was initiated for operation very near degeneracy, with signal and idler mode hopping. Two theoretical tuning curves are also shown in FIG. 15. These curves are calculated from the temperature-dependent Sellmeier equations for the index $n_e$ in congruent LiNbO$_3$ as published by Edwards et al. (dashed curve) "A temperature-dependent dispersion equation for congruently grown lithium niobate," Opt. Quantum Electon. 16, 373-374 (1994) and recently by Jundt (solid curve) "Temperature-dependent Sellmeier equation for the index of refraction, $n_2$, in congruent lithium niobate," Optics Letters 22 (20), 1553-5 (1997). Good agreement is observed with the Sellmeier equation of Jundt while, as has been reported elsewhere, the actual phase-matching temperature for SRO degeneracy is approximately 15° C. higher than that calculated by Edwards et al.

To summarize, 53-mm-long electric field periodically poled LiNbO$_3$ with a 6.5-$\mu$m-domain period was used to construct the first reported 532-nm-pumped cw QPM SRO. The SRO operated with a multi-longitudinal-mode diode-pumped frequency-doubled Nd:YVO$_4$ laser. Due to the large effective nonlinear coefficient and long interaction length of the PPLN sample, the SRO had a 930 mW internal threshold, exhibited 56% conversion efficiency, and was temperature tuned from 917 nm to 1267 nm. Although 532-nm-induced IR absorption and thermal lensing limited device performance, the crystal's large parametric gain enabled simple and reliable SRO operation with a variety of commercial pump lasers.

It will be clear to one skilled in the art that the above embodiment may be altered in many ways without departing from the scope of the invention. For example, materials other than $LiNbO_3$, such as $LiTaO_3$, $KTiOPO_4$ and its isomorphs, and $MgO:LiNbO_3$ may be used. Accordingly, the scope of the invention should be determined by the following claims and their legal equivalents.

What is claimed is:

1. A method for fabricating a periodically poled structure, the method comprising:
   a) providing a ferroelectric substrate with a periodic electrode structure on a surface of the substrate;
   b) applying a poling voltage waveform to the electrode structure to induce an electric field within the substrate, wherein the waveform induces a field substantially greater than a field required to cause domain reversal within the substrate;
   c) lowering the field to a critical value at which a domain wall velocity is most sensitive to changes in the field;
   d) maintaining the electric field until a current through the substrate drops substantially.

2. The method of claim 1 wherein the voltage level in b) is maintained for a period of between about 0.001 and about 1.0 milliseconds.

3. The method of claim 1 wherein the ferroelectric material is chosen from the group consisting of $LiNbO_3$, $LiTaO_3$, $KTiOPO_4$ and its isomorphs, and $MgO:LiNbO_3$.

4. The method of claim 1 further comprising
   e) lowering the voltage to zero.

5. The method of claim 4 wherein the voltage is lowered in e) at rate slower than a rate of relaxation of domains within the substrate.

6. The method of claim 1 further wherein the electric field in d) is greater than a field at which backswitching occurs within the substrate.

7. The method of claim 1 wherein the electric field in d) is maintained for a time greater than a relaxation time of the substrate.

8. The method of claim 1 wherein the electric field is maintained for a time t determined by t=x/v, where x is a domain wall half-width and v is a domain wall velocity.

9. The method of claim 7 further comprising:
   f) measuring a current through the substrate.

10. The method of claim 1 further comprising increasing an electrical resistance of the surface of the substrate.

11. The method of claim 10 wherein the electrical resistance is increased by annealing the substrate in oxygen to increase an electrical resistance of the surface.

12. The method of claim 10 the electrical resistance is increased by coating the surface with a spin-on glass and baking the substrate to form an insulator structure.

13. A periodically poled structure manufactured in accordance with the method of claim 1.

14. A frequency conversion device for quasi phase-matched interactions, comprising:
   a) a crystal having a domain structure that exhibits a patterned second-order non-linear coefficient, the domain structure being produced by a poling voltage waveform inducing a field substantially greater than a field required to cause domain reversal within said crystal and then inducing a lowered field at a critical value at which a domain wall velocity is most sensitive to changes in the field;
   b) an input aperture at a first face of the crystal; and
   c) an output aperture at a second face of the crystal, wherein the crystal has a length greater than about 1 centimeter and a power conversion efficiency of greater than about 10 percent.

15. The frequency conversion device of claim 14 wherein the crystal comprises a ferro-electric material.

16. The frequency conversion device of claim 15 wherein the ferro-electric material is chosen from the group consisting of lithium niobate, $LiTaO_3$, $KTiOPO_4$ and its isomorphs, and $MgO:LiNbO_3$.

17. The device of claim 14 wherein the domain structure has a period of less than about 10 microns.

18. The device of claim 14 wherein the device has a conversion efficiency of between about 10 percent and about 42 percent.

19. The device of claim 14 wherein the crystal has a thickness of greater than about 100 microns.

20. The device of claim 14 wherein the device is a single-pass device.

21. The device of claim 14 wherein the device is configured to implement a second order non-linear optical process.

22. The device of claim 21 wherein the second order non-linear process is a sum-frequency process.

23. The device of claim 21 wherein the second order non-linear process is a difference-frequency process.

24. The device of claim 21 wherein the second order non-linear process is a second harmonic generation process.

25. The device of claim 21 wherein the second order non-linear process is an optical parametric oscillation.

26. The device of claim 14 wherein the device is a waveguide.

27. The device of claim 14 wherein the crystal has a length of between about 10 millimeters and about 75 millimeters.

* * * * *